Feb. 5, 1946.   R. B. BARNES   2,394,508
METHOD OF AND APPARATUS FOR DETECTING CAMOUFLAGE
Filed Feb. 19, 1942   2 Sheets-Sheet 1
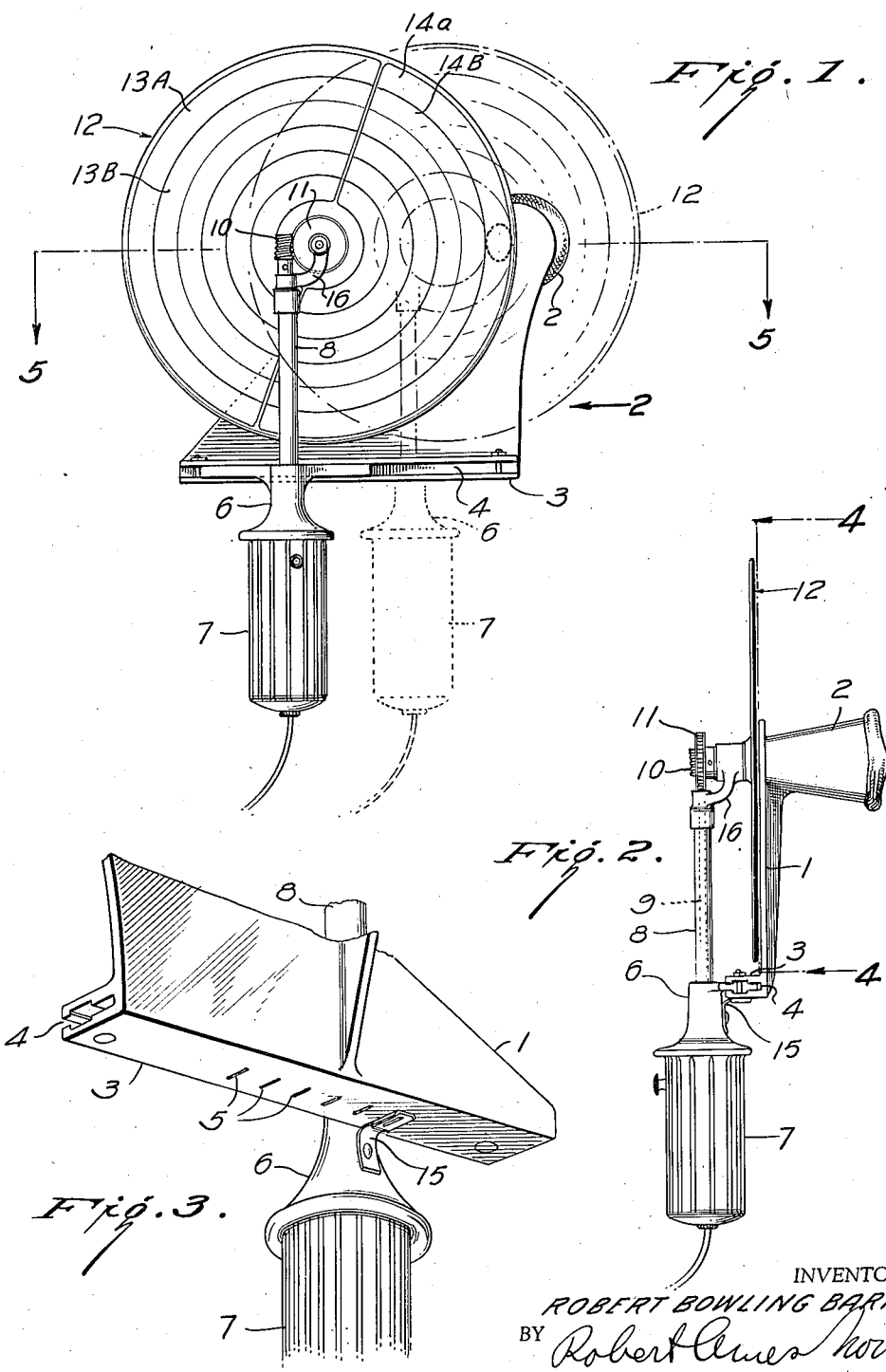
INVENTOR.
ROBERT BOWLING BARNES,
BY Robert Ames Norton
ATTORNEY.

Feb. 5, 1946. R. B. BARNES 2,394,508
METHOD OF AND APPARATUS FOR DETECTING CAMOUFLAGE
Filed Feb. 19, 1942 2 Sheets-Sheet 2

INVENTOR.
ROBERT BOWLING BARNES,
BY Robert Ames Norton
ATTORNEY.

UNITED STATES PATENT OFFICE 2,394,508

METHOD OF AND APPARATUS FOR DETECTING CAMOUFLAGE

Robert Bowling Barnes, Stamford, Conn., assignor to American Cyanamid Company, New York, N. Y., a corporation of Maine Application February 19, 1942, Serial No. 431,457

3 Claims. (Cl. 88—14)

This invention relates to methods and apparatus for distinguishing between colors which are close visual matches.

The human eye is essentially an integrating device and therefore most colors are seen by the eye by reason of various proportions of light of different spectral color reflected from the colored object. For example, a green object appears green because it has little reflecting power for blues and reds, and a higher reflecting power for green light. Many colors are obtained by mixing colors with different reflective powers, for example a mixture of blue pigment and yellow pigment will appear green to the eye and it is possible with suitable mixtures to match almost any color so that for some type of incident light the match appears perfect visually, and yet the two colors may have greatly differing spectrophotometric characteristics.

An important type of visual color match is military camouflage in which, for example, green colors are employed to simulate natural green color, and it is important to be able to distinguish between artificially colored greenery and the natural object. Of course where a complete spectrophotometric match is prepared as described in the copending application of Shurcliff and Stearns, Serial No. 406,012 filed August 8, 1941, there is no known means of detecting the difference between the natural and artificial green throughout the matched spectral regions. In the case of most greens, however, there are regions of the spectrum in which the reflectance differs quite widely and the same is true with many other colors.

The distinction between artificial colors and natural greenery or between different colors which may be a visual match under one light, for example sunlight, but would mismatch under tungsten incandescent light can be effected in various ways. For example if suitable filters are employed transmitting light through a narrow portion of the spectrum only, a difference in appearance may be noted and similarly infrared and ultra-violet photography may be used to distinguish between colors which while good matches in the visual may have distinguishing characteristics in the infrared and ultraviolet. These methods however, are open to a number of disadvantages. These photographic methods give monochromatic prints and do not distinguish readily between differences due to shadows and the like, and instantaneous results are not obtained. The use of filters in visual observation while satisfactory if exactly the right filters are used, is open to a serious disadvantage due to the fact that the human eye is far less efficient in discriminating between static differences of intensity than it is in distinguishing movement. Thus, for example, if two materials which are a match under ordinary visual observation in a particular light are viewed through filters which transmit light through only a portion of the spectrum where there is considerable difference in the spectral characteristics between the two colors, the eye can distinguish fairly close differences only when they are intensity differences.

The present invention depends on the use of alternate colored and neutral filters interposed in front of the eye at a rate slower than the persistence of vision but sufficiently rapidly to cause a flicker. The colored filters are band pass filters which subtract certain selected bands from the spectrum and each pair of colored and neutral filters have densities so chosen that one of the colored objects will appear to the eye equally bright through the neutral filter or the corresponding colored filter of each pair. Objects which are a visual match through neutral filters but which do not have substantially identical reflectances throughout the whole of the spectrum will flicker up or down in portions of the spectrum where there is a mismatch and in general will change color to a different extent. The eye is much more sensitive to such flickering than it is to static color or intensity differences. In the case of natural greenery, if desired the colored and neutral filters may be chosen so that the natural greenery will appear equally intense through the neutral and colored filters of each pair.

When the present invention is to be employed in detecting camouflage, particularly in connection with aircraft bombing, the eye cannot operate as efficiently with a bomb sight when viewing the landscape through a flickering pair of filters. In such a case, various series of filters are tried by the flicker method and as soon as it is determined where there is a difference, colored glasses of the same transmission may be used and the object, once identified by flickering, can be kept in view by the static contrast which, while not sufficient in many cases to recognize the difference in color in a landscape is quite sufficient to hold it in view once its location has been determined. It is thus possible to use a bomb sight with accuracy after it has been determined what filters are to be used.

While the present invention in its broader process aspect is not limited to any particular mechanism, I prefer to use a rotating device in the form of a disc having half of the disc in the form of concentric bands of filters of different colors and the other half provided with corresponding bands of neutral filters so that objects viewed through the neutral filter will appear to have a predetermined low level of brightness which may, for example, match the brightness of the colored filter for certain standard colors. The disc is rotated at a speed such that the filters pass before the eye successively at a rate slower than the rate of vision but fast enough to give a flicker. A viewing mask or opening is provided which can be moved up or down so that one colored filter is viewed at a time. It is also desirable to make the motion of the mask in a series of steps so that the particular filter number can be determined immediately and a suitable filter used in ordinary glasses or goggles for static observation of the landscape in the case of camouflage detection.

In the case of colors other than military, the particular filter or filters through which flickering is observed show the parts of the spectrum at which there is a mismatch.

For military working the spectral response of natural greenery is used as a standard and the neutral filters are preferably of such density that natural green objects appear equally bright through the neutral filter and the colored filter. In the case of industrial uses, it may be necessary to provide suitable adjustments of the neutral filters so as to cause a given standard color to show the same brightness at all points in the spectrum. Otherwise flickering of both the comparison sample and the sample to be tested may take place and it is easier for the eye to distinguish between flickering of one with no flickering of the other than to distinguish between different degrees of flickering. The invention will be described in greater detail in conjunction with a specific embodiment illustrated in the drawings in which:

Fig. 1 is a rear elevation of the device;

Fig. 2 is a side view looking along the line 2—2 in Fig. 1;

Fig. 3 is a detailed perspective view in enlarged scale of a portion of the apparatus;

Figure 4:
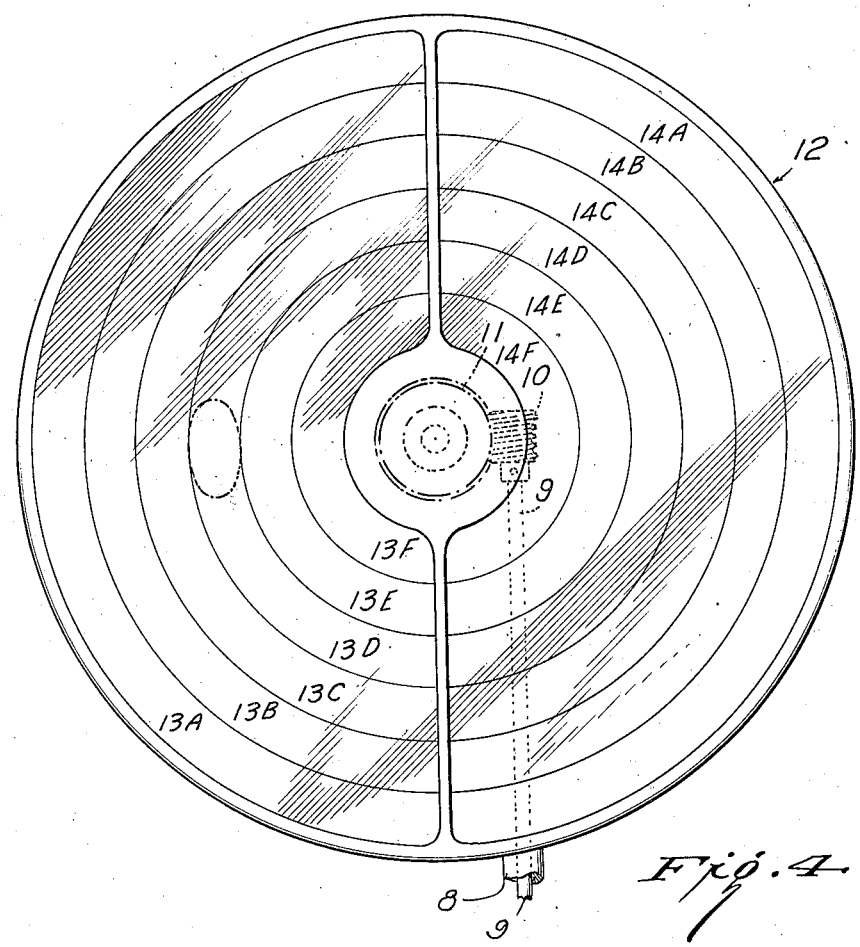
Fig. 4 is an enlarged vertical section taken along the line 4—4 of Fig. 2.
Figure 5:
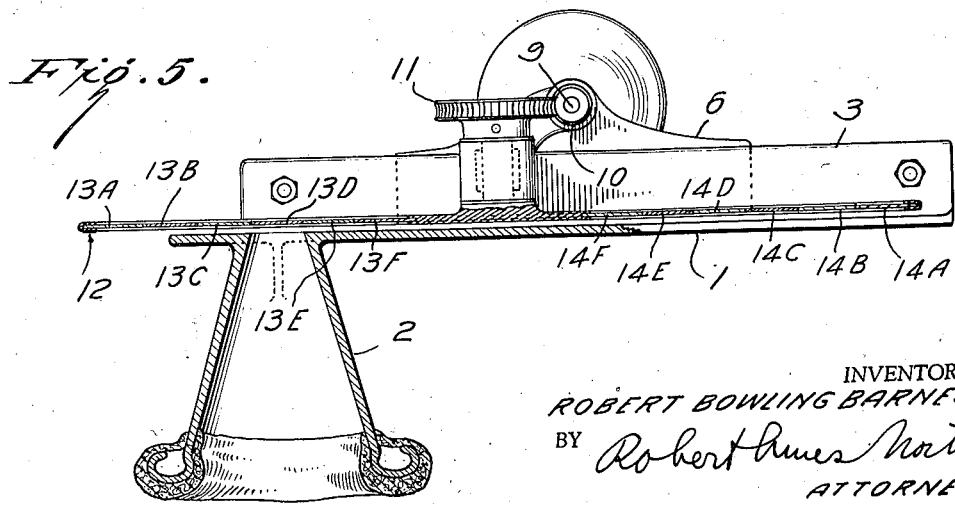
Fig. 5 is a horizontal section along the line 5—5 of Fig. 1.

The drawings illustrate a portable device according to the invention which is provided with a framework 1 carrying a padded eye piece 2, the lower edge of the framework being provided with a flange 3 in which a slot 4 is cut. A member 6 slides in the slot and carries a motor 7 which is preferably of the synchronous type. The member 6 is capable of sliding in the slot and carries a spring detent 15 which can engage with indentations 5 in the lower surface of the flange 3. Thus the member 6 can be slid into successive predetermined positions controlled by the location of the indentations 5 and will be held in position by the detent 15. The motor 7 drives a shaft 9 which extends up through a hollow member 8 which is preferably rigidly connected or integral with the member 6. This hollow member carries at its upper end an arm 16 with a suitable journal for an axle on which is mounted a rotatable filter disc 12. On the rear side of the journal a worm wheel 11 is connected to the axle and engages a worm 10 driven by the motor shaft 9. Preferably the pitch of the worm and the teeth on the worm wheel are so chosen that in normal operation the axle and the disc will rotate at about 1 revolution per second.

The disc carries a series of concentric semi-circular filters 13 A, B, C, D, E and F, with corresponding gray filters 14 A, B, C, D, E, and F, the width of each filter being equal to the opening in the eye piece 2 and the indentations 5 being so arranged that the member 6 carrying the disc can be slid into successive positions so that in each position only a single filter is interposed in the line of sight. The filters 13 A—F are selected from different portions of the visible spectrum and the number may be varied, six filters as shown in the drawings being a very satisfactory number for practical operation.

Preferably each color filter and its corresponding gray filter are so chosen that objects of a predetermined color will appear equally bright to the eye through the colored filter and its corresponding neutral gray filter, although of course the images will change in color somewhat.

In operation when it is desired to determine a mismatch such as natural greenery and artificial green color or two colored surfaces which match under certain conditions of illumination, the motor is started and the objects or surfaces are viewed first through one of the pairs of colored and gray filters and then through the other, it being noted through what filters there appears to be a change in brightness or color or both. The comparison shows at any one color represented by one of the filters 13 which object appears to be brighter and which dimmer. In case of objects dimmer than the standard, they will flicker from equal brightness under the gray filter to less brightness under the colored filter and conversely where objects are brighter than the standard through a particular colored filter, its flickering will be up instead of down. This enables the operator to make a qualitative determination at the colors of each of the filters which surface or object is brighter or dimmer than standard at the particular color. In the case of military operation as has been described more generally above, as soon as it has been determined by the flickering that certain portions of the landscape have markedly different characteristics at certain of the filter colors, the observer may insert a corresponding colored filter in a pair of goggles and operate a bomb sight using a static difference in brightness of the object already located by flickering.

While the drawings show a very light and simple device which is readily portable, it should be understood that the present invention is not limited to the mechanical details therein set forth, and any suitable mechanism which will alternately interpose a colored filter and a neutral filter in the line of sight may be employed. Electric drive through synchronous motors is the simplest and most reliable, but any other drive such as a suitable spring motor may be employed where reliance on a source of electric energy is not desired.

For many general applications a series of filters passing single bands in different points of the spectrum have considerable advantages. Where, however, the problem is to detect a visual match in which one of the colors consists of a mixture of pigments or dyes at least one of which is known, the maximum contrast is obtained by using a filter the transmission characteristics of which are exactly the reverse of the reflection characteristics of the known component so that the known component appears substantially black or dark gray. A maximum color change and intensity flicker will result. This modification is of importance in the detection of military camouflage where it is known that a particular pigment is being used by the enemy. It has the disadvantage for much general work that a different filter is required for each suspected component and for general work where the particular components are not known, a series of narrow band pass filters will normally be preferred.

I claim:

1. A method of detecting difference in colors which are close visual matches but not spectrophotometrically identical which comprises successively observing the colors through a series of filter pairs, each pair consisting of a band pass colored filter and a neutral filter, the colored filters of the series of filter pairs passing different spectral ranges, the densities of the filters of each pair being so chosen that one of the colors appears of the same brightness when observed through either filter in the pair, the filters of each pair being alternately interposed into the line of sight at a rate below the persistence of vision but fast enough to produce flickering where there is a spectrophotometric mismatch in the colors.

2. A method of detecting military camouflage which comprises successively observing a landscape through a series of filter pairs, each pair consisting of a band pass colored filter and a neutral filter, the colored filters of the series of filter pairs passing different spectral ranges, the densities of the filters of each pair being so chosen that natural greenery appears of the same brightness when observed through either filter in the pair, the filters of each pair being alternately interposed into the line of sight at a rate below the persistence of vision but fast enough to produce flickering of portions of the landscape artificially colored with colors which are not perfect spectrophotometric matches for natural greenery.

3. A device for detecting military camouflage which comprises a support in which there is rotatably mounted a disc provided with concentric sections, each section consisting of a band pass colored filter and a neutral filter, the colored filters of the different sections passing different spectral ranges and the densities of the colored and neutral filters of each section being so chosen that natural greenery will appear equally bright when viewed through either filter, an eye-piece mounted on the support for movement radially of the disc and having dimensions not exceeding the radial width of a filter section, means for displacing the eyepiece radially of the disc in steps so that a single section is selected for each position of the eyepiece and means for rotating the disc at a rate such that the filters of each chosen concentric section are successively passed before the eyepiece at a rate slower than the persistence of vision but fast enough to produce flickering when the filters of a pair transmit unequal quantities of light.

ROBERT BOWLING BARNES.